Oct. 29, 1957  B. E. O'CONNOR  2,811,227
FLUTTER DAMPER
Filed Jan. 20, 1955  2 Sheets-Sheet 1

INVENTOR
BERNARD E. O'CONNOR
BY
ATTORNEYS

Oct. 29, 1957     B. E. O'CONNOR     2,811,227
FLUTTER DAMPER

Filed Jan. 20, 1955     2 Sheets-Sheet 2

INVENTOR
BERNARD E. O'CONNOR
ATTORNEYS

# United States Patent Office 2,811,227
Patented Oct. 29, 1957

2,811,227

FLUTTER DAMPER

Bernard E. O'Connor, Birmingham, Mich., assignor to Houdaille Industries, Inc., a corporation of Michigan Application January 20, 1955, Serial No. 483,002

2 Claims. (Cl. 188—93)

This invention relates to improvements in dampers for damping flutter of the adjustable airfoil members of aircraft.

In the damping of flutter involving the adjustable airfoil members of aircraft, the conventional damping methods and apparatus heretofore used have rapidly been becoming obsolete due to the smaller airfoil sections, crowded frame designs and increased speeds of operation.

With the higher speeds of aircraft, flutter dampers must be designed not only to take into account flutter, a self-excited vibration, but also in some cases a phenomenon called "buzz" which is caused by walking shock waves on the airfoil surfaces in flight which result in a sinusoidal excitation with gaps.

It has been found that the stiff rotary shock absorber principle can be adapted to efficiently damp flutter and other vibrations involving the airfoil assembly and that by correctly proportioning the parts of the shock absorber that a damper of a relatively small cross-section and relatively great length compared with its cross-sectional area can be attained, which will fit within the airfoil parts and will accommodate relatively free adjustable movement of the adjustable airfoil sections and effectively damp the relatively high frequency vibrations of flutter as well as other vibrations involving the airfoil assembly encountered in flight.

A principal object of my invention, therefore, is to provide a flutter damper adhering to certain critical relationships and accommodating relatively unrestrained adjustment of the airfoil members of aircraft, but effectively damping flutter thereof.

Another object of my invention is to provide a flutter damper constructed in accordance with the principles of construction of stiff rotary shock absorbers by adhering to critical proportions between the length and diameter of the damper and working chambers thereof, and accommodating the damper to effectively damp the relatively high frequency vibration of flutter and be contained in a far smaller airfoil section than has heretofore been considered possible.

A still further object of my invention is to provide an improved flutter damper constructed in accordance with the general principles utilized in the so-called stiff rotary shock absorbers, and so constructed and arranged as to accommodate relatively free adjustment of the adjustable airfoil parts of the aircraft and effectively damp flutter of the adjustable airfoil parts in any position the parts and damper may assume in the maneuvering of the aircraft with which they are associated.

It is an additional object of my invention to provide an improved flutter damper far more compact particularly in transverse section than the flutter dampers heretofore in use, and operating to damp flutter with increased efficiency over prior damping methods and systems.

Still another object of the invention is to provide a fluid operated mechanical damper of a compact and light construction, having an improved operating capacity per unit of weight with reduced resistance to normal operation of the airfoil parts of the aircraft with which the damper is associated than has heretofore been considered possible.

These and other objects of my invention will appear from time to time as the following specification proceeds and with reference to the accompanying drawings wherein.

Figure 1:
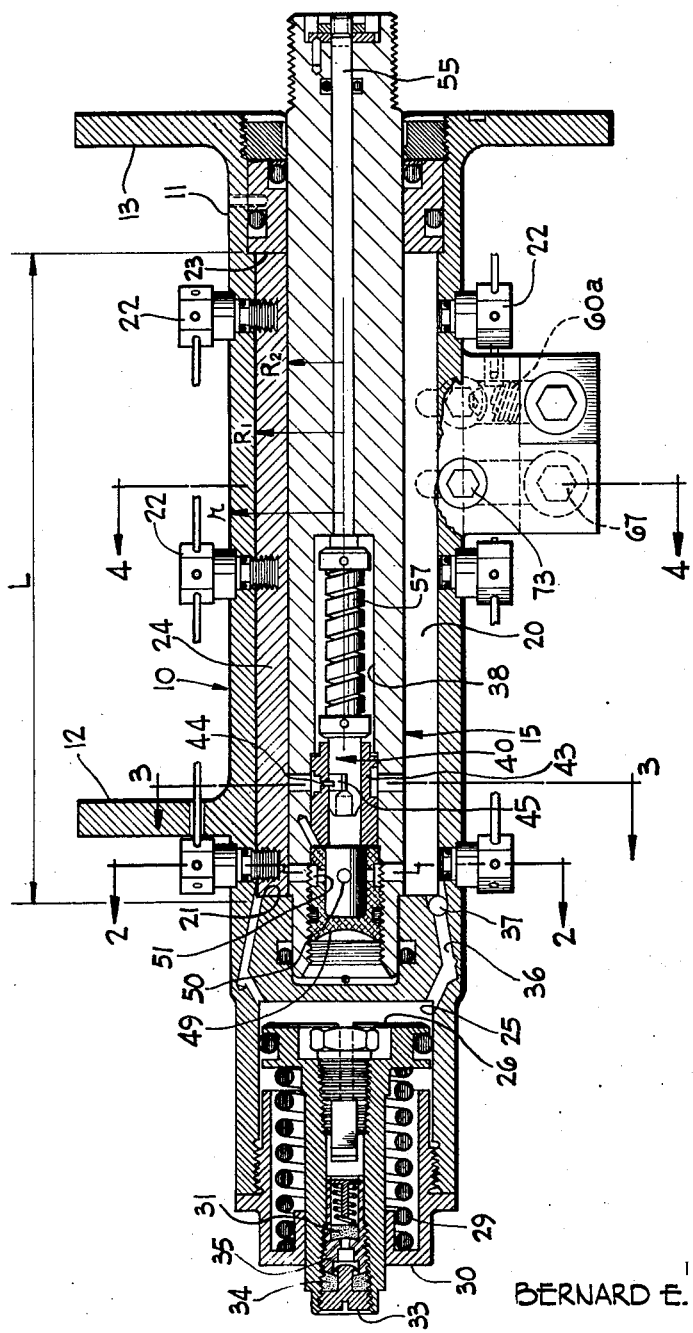
Figure 1 is a schematic longitudinal sectional view taken through a rotary damping structure constructed in accordance with my invention, with certain parts thereof broken away.
Figure 3:
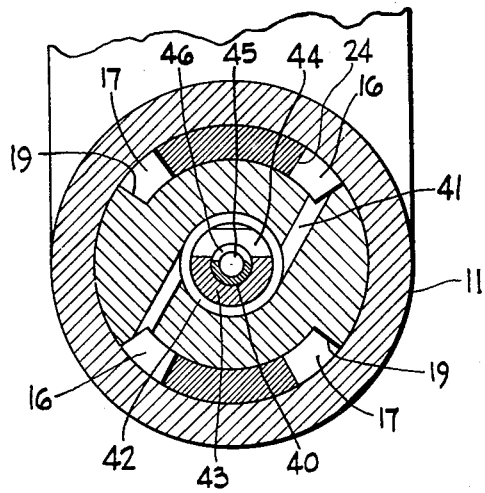
Figure 3 is a sectional view taken substantially along line III—III of Figure 1.
Figure 2:
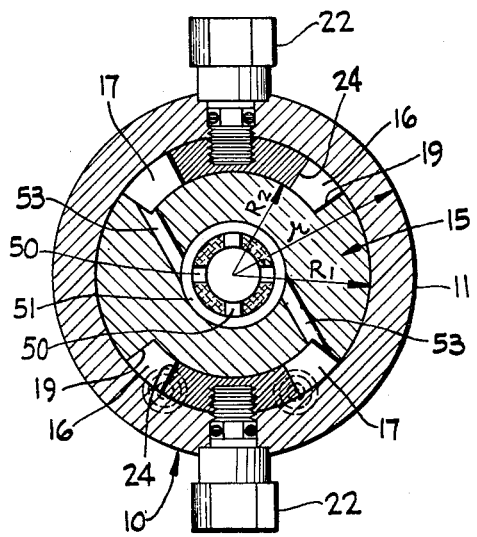
Figure 2 is a transverse sectional view taken substantially along line II—II of Figure 1.
Figure 4:
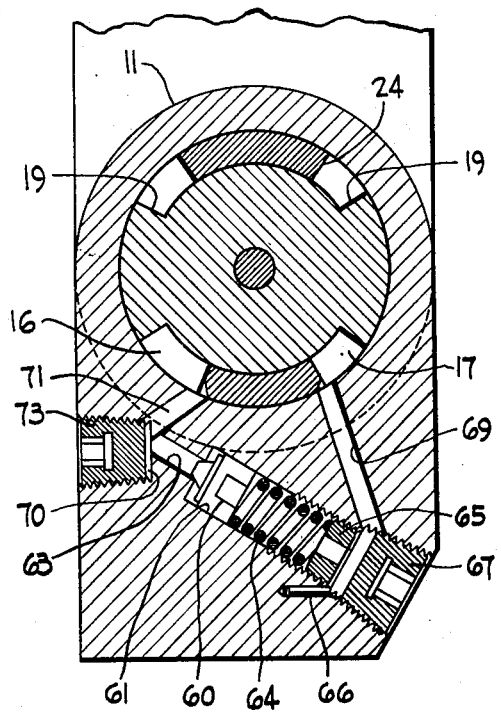
Figure 4 is a sectional view taken substantially along line IV—IV of Figure 1 in order to show the relief valve relieving pressure from the working chambers of the damper upon excessive pressure conditions.

In the embodiment of my invention illustrated in the drawings, reference character 10 designates generally a flutter damper constructed in accordance with my invention and capable of being contained in free working relation within the front or joint portion of a movable control surface member of an airplane airfoil assembly, such as an elevator, stabilizer or the like to damp the tendency of the airfoil assembly to flutter.

The flutter damper 10 is shown as being a rotary vane hydraulic piston type of damper comprising an elongated cylinder or envelope 11, which may be mounted coaxially with the hinge axis of a pivoted airfoil member (not shown) and which may be attached thereto by means of attachment flanges 12 and 13, which may be attached to suitable brackets (not shown) carried interiorly of the movable control member of the airplane and having a rotary piston 15 carried therein and projecting from one end thereof, and forming a plurality of working chambers 16 and 17 between said wing shaft and the inner wall of said cylinder. The cylinder or envelope 11 may thus be rigidly secured to the movable control member of the airplane for rocking movement about the axis of movement of the control member as the latter swings or tends to flutter while the projecting end of the piston 15 may be secured to a stationary part of the airplane.

The rotary piston 15, commonly called a wing shaft, is provided with a pair of diametrically opposed laterally projecting vanes or wings 19 extending longitudinally therealong from one end thereof to another of an interior chamber 20, one end of which is defined by a shouldered wall portion 21 at one end of the cylinder or envelope 11 and the other end of which is defined by a seal 23 adjacent the opposite end of said envelope 11. The working chambers 16 and 17 are defined by opposite edges of diametrically opposed fluid reaction members or dividers 24 and the adjacent edges of the vanes 19. The dividers 24 are held in position within the inner cylindrical wall of the envelope 11, by retaining screws 22 extending through the wall of said envelope and sealed thereto and threaded within said dividers.

At the opposite end of the cylinder or envelope 11 from the projecting end of the rotary piston 15, shown as being formed integrally with said cylinder is a pressurized fluid replenishing chamber 25 operating on principles similar to that shown in my joint application with Benjamin Fuente Serial No. 209,444, filed February 5, 1951, and entitled "Flutter Damper for Aircraft," so only herein shown and described in sufficient detail to render my present invention readily understandable.

The replenishing chamber 25 is shown as having a piston 26 therein biased toward the inner end of said chamber by a compression spring 29 seated in an end cap member 30, threaded or otherwise secured to said replenishing chamber. The piston 26 is shown as being slidably guided in the end cap member 30 and as being hollow throughout its length for the admission of fluid under pressure thereto. As herein shown a check valve 31 is provided in the hollow interior portion of the piston 26 to accommodate the flow of fluid under pressure within said replenishing chamber and to block the back flow of fluid from said replenishing chamber, as in my aforementioned joint application with Benjamin Fuente Serial No. 209,444. A closure plug 33 is threaded in the hollow outwardly projecting end portion of the piston 25 and is sealed to the wall of a hollow portion of the piston 26 as by a seal 34, abutting inner wall of the hollow portion of the piston and a body 35 for the check valve 31.

Hydraulic fluid under pressure introduced into the damper 10 through the replenishing chamber 25 passes into the working chambers 16 and 17 through passageways 36 leading from said replenishing chamber to the working chambers 16 and 17 and having check valves 37 therein, to block the back flow of hydraulic fluid from said working chambers back through the pasageways 36 into the replenishing chamber 25.

Fluid is displaced from the working chambers 16 to the working chambers 17 and vice versa under the control of a fluid displacement control valve 40 in a hollow interior portion 38 of the rotary piston 15. Fluid displacement ports 41 are shown as leading from the chamber 16 and as having communication with an annular outwardly opening passageway 42 formed in an orifice body 43 mounted within the hollow interior portion 38 of the rotary piston 15. The annular passageway 42 communicates with a slit-like chordal control orifice 44 extending transversely of the orifice body 43 and shown as intersecting an orifice control valve 45 rotatably mounted in the center of the orifice body 43.

The orifice control valve 45 is of a generally cylindrical form having an open inner end, communicating with a chordal slit 46 extending within and having communication with the slit-like chordal control orifice 44. Turning of the orifice control valve 45 within the orifice body 43 will thus vary the cross-sectional passageway area between the chordal orifice 44 and the chordal slit 46 and vary the restriction of a flow of fluid through said slit and out the valve through the hollow interior thereof into a hollow end plug 49, threaded within the inner end of the rotary piston 15. The hollow end plug 49 is shown as having cross-drilled passageways 50 communicating with an annular passageway 51 extending thereabout and having communication with passageways 53 leading to the chambers 17.

The orifice control valve 45 is turned within the orifice body 43 by means of a rod 55 extending within the rotary piston 15 from the outer end thereof into the hollow interior portion 38 of the rotary piston 15. A spiral bi-metal thermostatic element 57 is secured at one of its ends to the inner end of the rod 55 and at its opposite end to the orifice control valve 45. Turning of the rod 55 will, therefore, rotatably positioned said valve through the spiral thermostatic element 57 to vary the flow orifice leading through said valve as required. The thermostatic element 57 also affords a means for compensating for the variations in temperature encountered in the service of the aircraft and rotatably moves said orifice control valve to restrict or open the orifice from a mean temperature rate of adjustment, to compensate for changes in viscosity of the damping fluid as the temperature changes.

The opposed working chambers 16 and 17 are connected together through a relief valve 60 in a chamber 61 and adjusted to blow off and relieve pressure from the chambers 16 at a predetermined overload torque. The chambers 17 and 16 are connected together by a relief valve 60a like the relief valve 60, and arranged oppositely from the relief valve 60 to relieve overload pressure from the chambers 17. The two relief valves are alike so the valve 60 only need herein be shown and described in detail.

The valve 60, is biased into engagement with a port 63 leading from one end of the chamber 61, by a preloaded spring 64. The spring 64 is seated at one end on the valve 60 and at its opposite end on an annular retainer 65, threaded within the chamber 61 and retained within said chamber as by a locking pin 66. A plug 67 is threaded within the outer end of the chamber 61 to seal the same. The plug 67 may be made of tin or a like material softer than the metal of the cylinder, to attain a tight seal holding fluid within the chamber 61 under high pressure conditions without leakage. A passageway 69 connects the chamber 61 with the working chamber 17.

The port 63 leads to a chamber 70 having communication with the working chamber 16 as by a passageway 71. The chamber 70 is shown as being sealed by a plug 73 like the plug 67 and preferably made from tin or a like material to provide a tight leak-proof seal for said port.

Referring now to the critical limits between the outer radius of the working chambers designated by ($R_1$), the inner radius of the rotary piston 15 at the root of the vanes 19 and designted by ($R_2$), the outer radius of the envelope or cylinder 11 designated by ($r$), and the length of the working chamber 20 designated by ($L$), which are necessary to attain an efficient damper of a relatively small cross-section, and operating on the principles of a stiff damper, but accommodating relatively free adjustment of the airfoil parts and damping high frequency vibrations thereof. First assuming that the housing stiffness is considerably greater than that of the remaining component of stiffness and therefore, is required to account only for the fluid and shaft torsion stiffness, in order that the damper 10 when small enough to be contained within an airfoil, may effectively damp flutter and other vibrations and accommodate free adjustable movement of the airfoil, the upper critical limit of the proportion of the inside radius of the working chamber ($R_2$) to the outside radius of the working chamber ($R_1$) must be as follows:

$$\frac{R_2}{R_1} = .315 \log_{10}\frac{(L)}{R_1} + .74$$

The lower critical limit of the proportion of the inside radius of the working chamber ($R_2$) to the outside radius of the working chamber ($R_1$) must be as follows:

$$\frac{R_2}{R_1} = .315 \log_{10}\frac{(L)}{R_1} + .34$$

In cases where housing size is limited; it is necessary to take into account the relationship of shaft torsion, fluid stiffness and housing stiffness and it has been found that the upper and lower critical limits of the proportion of the inside radius ($R_1$) of the envelope or cylinder 11 to the outside radius $r$ of the envelope must be between 0.9 and 0.6 respectively.

It further has been found that the upper critical limit of the ratio of the inside radius of the working chamber ($R_2$) to the outside radius of the housing ($r$) is one fortieth of the ratio of the length of the working chamber to the outside radius of the housing $r+0.65$.

In a similar manner the lower critical limit of the proportion of the inside radius of the working chamber ($R_2$) to the outside radius of the housing ($r$) is one fortieth of the proportion of the length of the working chamber ($L$) to the outside radius of the housing $r+0.25$.

It should here be understood that if ($r$) or the diameter of the outside of the envelope is not a continuous radius that the term ($r$) shall mean an equivalent radius where "equivalent" refers to energy storage of the housing under internal pressure in the working chambers 16 and 17.

The foregoing critical limits when adhered to, result in an effective damper which may readily fit within the smaller airfoil sections current in high speed aircraft, and will accommodate free adjustment of the sections, and effectively damp the relatively high frequency vibration of flutter and will also damp the other vibrations involving the airfoil assembly encountered in flight.

It will be understood that modifications and variations may be effected without departing from the scope of the novel concepts of the present invention.

I claim as my invention:

1. In a hydraulic flutter damper for damping airfoil vibration and accommodating free adjustable movement thereof, an envelope comprising an elongated cylinder having an inner wall, a rotary piston journalled within said cylinder in radially spaced relation with respect to said inner wall and sealed thereto, fluid reaction dividers secured to said inner wall and having slidable engagement with said inner wall and piston, vanes on said piston cooperating with said dividers and forming a plurality of variable volume working chambers, fluid passageways leading through said piston and connecting said working chambers together, a fluid displacement valve in said piston controlling displacement of hydraulic fluid between working chambers, a valve chamber within said envelope and spaced from said working chambers, a port leading from one end of said valve chamber, a passageway leading from said port to one of said working chambers, a valve, a spring seating said valve on said port, an annular adjusting member in said chamber for preloading said spring, a passageway leading from the other end of said valve chamber to another of said working chambers, and means sealing opposite ends of said valve chamber comprising plugs threaded within the wall of said cylinder and of a softer metal than the metal of said cylinder.

2. In a hydraulic flutter damper for damping airfoil vibration, an envelope comprising an elongated cylinder having an inner wall, a rotary piston journalled within said cylinder in radially spaced relation with respect to said inner wall and sealed thereto, fluid reaction dividers secured to said inner wall and having slidable engagement with said inner wall and piston, vanes on said piston cooperating with said dividers and forming a plurality of variable volume working chambers, fluid passageways leading through said piston and connecting said working chambers together, a fluid displacement valve in said piston controlling displacement of hydraulic fluid between working chambers, oppositely disposed valve chambers within said envelope and spaced from said working chambers, passageways leading from opposed working chambers to opposite ends of said valve chambers, a valve in each valve chamber, springs biasing said valves closed, means for preloading said springs, said valves being oppositely arranged, to each relieve overloads from complemental working chambers, and means sealing said valve chambers comprising plugs threaded within the walls of said chambers and of a softer metal than the metal of walls of said valve chambers.

References Cited in the file of this patent

UNITED STATES PATENTS

| | | |
|---|---|---|
| 1,875,860 | Eckhard | Sept. 6, 1932 |
| 1,932,770 | Crowe | Oct. 31, 1933 |
| 1,945,568 | Rossman et al. | Feb. 6, 1934 |
| 2,018,564 | Milly | Oct. 22, 1935 |
| 2,070,799 | McKee | Feb. 16, 1937 |
| 2,229,660 | Magrum | Jan. 28, 1941 |